(12) United States Patent
Sicheneder et al.

(10) Patent No.: US 12,207,578 B2
(45) Date of Patent: Jan. 28, 2025

(54) FINISHING TOOL ASSEMBLY POSITION CONTROL SYSTEM FOR AN AGRICULTURAL TILLAGE IMPLEMENT

(71) Applicant: CNH Industrial America LLC, New Holland, PA (US)

(72) Inventors: Derek Sicheneder, Morton, IL (US); William E. Allen, Peoria, IL (US); Kea Voa Chin, Washington, IL (US)

( * ) Notice: Subject to any disclaimer, the term of this patent is extended or adjusted under 35 U.S.C. 154(b) by 255 days.

(21) Appl. No.: 17/889,906

(22) Filed: Aug. 17, 2022

(65) Prior Publication Data

US 2024/0057497 A1  Feb. 22, 2024

(51) Int. Cl.
*A01B 63/00* (2006.01)
*A01B 63/28* (2006.01)

(52) U.S. Cl.
CPC ............ *A01B 63/008* (2013.01); *A01B 63/28* (2013.01)

(58) Field of Classification Search
CPC ..... A01B 63/111; A01B 63/22; A01B 63/008; A01B 63/28; A01B 63/1112; A01B 61/04; A01B 19/04; A01B 79/00
See application file for complete search history.

(56) References Cited

U.S. PATENT DOCUMENTS

| | | | |
|---|---|---|---|
| 4,088,084 A | 5/1978 | van der Lely | |
| 7,766,093 B2 | 8/2010 | Becker et al. | |
| 8,573,319 B1 * | 11/2013 | Casper | A01B 63/112 172/4 |
| 9,247,687 B2 | 2/2016 | Gray et al. | |
| 9,521,798 B2 | 12/2016 | Kovach et al. | |
| 10,768,331 B2 | 9/2020 | Koch et al. | |
| 10,820,476 B2 | 11/2020 | Stoller et al. | |

(Continued)

FOREIGN PATENT DOCUMENTS

| | | |
|---|---|---|
| CA | 2708511 C | 6/2015 |
| CN | 203851426 U | 10/2014 |

(Continued)

OTHER PUBLICATIONS

U.S. Appl. No. 16/830,531, filed Mar. 26, 2020, Michael George Kovach.

(Continued)

*Primary Examiner* — Tan Q Nguyen
(74) *Attorney, Agent, or Firm* — Rebecca Henkel; Rickard K. DeMille; Peter K. Zacharias

(57) ABSTRACT

A finishing tool control system for an agricultural implement may include a controller communicatively coupled to a first and a second sensor. The controller is configured to control a height of a finishing tool above a soil surface. Further, the first sensor is configured to output a signal indicative of a height of a main frame of the agricultural implement above the soil surface. In response to determining that a height increase of the main frame exceeds a threshold height adjustment, the controller increases the height of the finishing tool. The second sensor is configured to output a signal indicative of the height of the finishing tool of the finishing assembly above the soil surface. Moreover, in response to determining that a height of the finishing assembly above the soil surface is less than a threshold value, the controller increases the height of the finishing tool.

20 Claims, 3 Drawing Sheets

(56) References Cited

U.S. PATENT DOCUMENTS

| | | | |
|---|---|---|---|
| 2014/0048296 A1* | 2/2014 | Bassett | A01C 7/205 172/4 |
| 2015/0264857 A1* | 9/2015 | Achen | A01B 63/32 172/260.5 |
| 2016/0183446 A1* | 6/2016 | Achten | A01B 63/145 172/2 |
| 2017/0079194 A1* | 3/2017 | Janelle | A01B 21/08 |
| 2020/0146201 A1 | 5/2020 | Figueroa et al. | |
| 2021/0007266 A1 | 1/2021 | Stoller et al. | |
| 2021/0045274 A1 | 2/2021 | Cozza et al. | |
| 2021/0048290 A1 | 2/2021 | Henry | |
| 2021/0068331 A1* | 3/2021 | Sporrer | A01B 63/16 |
| 2021/0105942 A1 | 4/2021 | Paxinos et al. | |
| 2021/0131856 A1 | 5/2021 | Henry | |
| 2021/0219482 A1 | 7/2021 | Smith et al. | |
| 2022/0132720 A1 | 5/2022 | Gray et al. | |

FOREIGN PATENT DOCUMENTS

| | | |
|---|---|---|
| EP | 0776598 B1 | 5/2002 |
| JP | 5080924 B2 | 11/2012 |
| TR | 201202886 U | 9/2012 |

OTHER PUBLICATIONS

U.S. Appl. No. 16/830,331, filed Mar. 26, 2020, Michael George Kovach.

U.S. Appl. No. 16/830,335, filed Mar. 26, 2020, Michael George Kovach.

U.S. Appl. No. 16/830,344, filed Mar. 26, 2020, Michael George Kovach.

U.S. Appl. No. 16/830,373, filed Mar. 26, 2020, Michael George Kovach.

U.S. Appl. No. 16/830,410, filed Mar. 26, 2020, Michael George Kovach.

* cited by examiner

FINISHING TOOL ASSEMBLY POSITION CONTROL SYSTEM FOR AN AGRICULTURAL TILLAGE IMPLEMENT

BACKGROUND OF THE INVENTION

The present disclosure relates generally to a finishing tool assembly position control system for an agricultural tillage implement.

Certain agricultural implements include ground engaging tools configured to interact with the soil. For example, a tillage implement may include disc blades and/or finishing assemblies (e.g., rolling baskets, rolling harrows, crumbler baskets) configured to break up and smooth the soil for subsequent planting or seeding operations. Certain tillage implements include a depth adjustment mechanism configured to control a penetration depth of the disc blades into the soil. For example, a tillage implement may include an actuator extending between a wheel assembly and a main frame of the tillage implement. The actuator may be adjusted to set the height of the main frame relative to the surface of the soil, thereby adjusting the penetration depth of the disc blades coupled to the main frame. Additionally, certain tillage implements may include one or more finishing assemblies disposed behind the disc blades relative to the direction of travel of the tillage implement. The finishing assemblies may be used to break-up soil clods, level, and smooth the soil surface tilled by the disc blades. During operation, the tillage implement may be pulled by a work vehicle (e.g., tractor) across a field (e.g., soil surface). Additionally, the work vehicle may turn (e.g., at a headland), thereby causing the tillage implement to turn as well. Prior to the turn, the ground engaging tools may be lifted to substantially reduce or eliminate undesirable contact with the soil surface and/or obstructions (e.g., plant debris, rocks) during the turn.

SUMMARY OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In certain embodiments, a finishing tool position control system for an agricultural implement includes a controller comprising a memory and a processor, wherein the controller is configured to control a height of a finishing tool of a finishing assembly above a soil surface. Further the finishing tool position control system includes a sensor assembly. The sensor assembly includes a first sensor communicatively coupled to the controller and configured to output a first signal indicative of a height of a main frame of the agricultural implement above the soil surface, wherein the controller is configured to receive the first signal and to increase the height of the finishing tool above the soil surface in response to determining that an increase in the height of the main frame above the soil surface exceeds a threshold height adjustment. Alternatively, the sensor assembly includes a second sensor communicatively coupled to the controller and configured to output a second signal indicative of a height of the finishing tool of the finishing assembly above the soil surface, wherein the controller is configured to receive the second signal and to increase the height of the finishing tool above the soil surface in response to determining that the agricultural implement is in a non-working operation mode and the height of the finishing tool above the soil surface is less than a threshold value.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
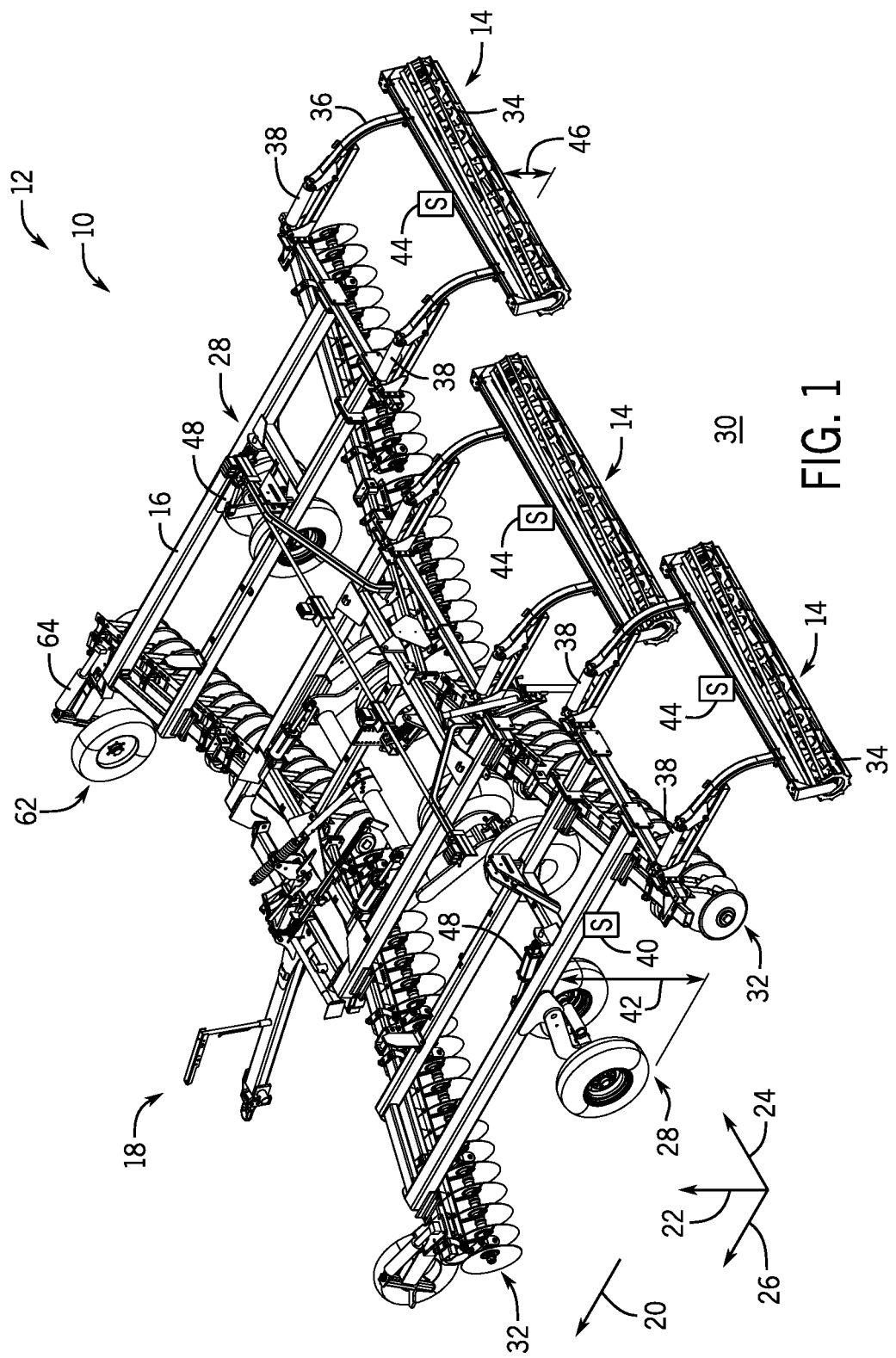
FIG. 1 is a perspective view of an agricultural implement having a rolling basket position control system and multiple rolling basket assemblies distributed across a width of the agricultural implement, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Tillage implements may include at least one finishing assembly (e.g., rolling basket(s), rolling harrow(s), crumbler basket(s)) configured to break up soil clods (e.g., clumps of soil) and/or churn the soil, thereby producing a level and smooth soil surface with a consistent soil texture. For example, certain tillage implements have one or more finishing assemblies, such as rolling basket assemblies, extending from a main frame of the tillage implement. Each rolling basket assembly may be pivotally coupled to the main frame and positioned behind, with respect to the direction of travel of the work vehicle, one or more disc blade assemblies that may be coupled to the main frame. Further, the disc blade assemblies may be used to till (e.g., plough, cultivate, turn over) the soil surface as the work vehicle pulls the tillage implement across the field (e.g., the soil surface).

In addition, the finishing assemblies may be used to finish and/or further till the soil surface by churning, smoothing, and leveling the tilled soil. The finishing assemblies may include finishing disc assembly/assemblies, rolling basket assembly/assemblies, and/or other suitable type(s) of finishing assembly/assemblies. For example, multiple rolling basket assemblies may be distributed along a width of the main frame. During operation, at least one of the rolling basket assemblies may be rotated/oriented to place the rolling basket assembly in a working position, which may enable the rolling basket assembly to engage a surface of a field. Additionally or alternatively, at least one of the rolling basket assemblies may be rotated/oriented to place the rolling basket assembly in a non-working position, which may enable the rolling basket assembly to be disengaged from the surface of the field, such as for a headland turn or transport of the tillage implement.

While in the working position and to provide a consistent finishing result, a down pressure of each rolling basket assembly may be controllably adjusted to a target down pressure/target down pressure range. In certain embodiments, the tillage implement includes a rolling basket position control system having one or more actuators (e.g., hydraulic actuator(s), etc.) and/or one or more sensors that are each communicatively coupled to a controller of the rolling basket position control system. At least one actuator may be coupled to each rolling basket assembly, and the controller may control vertical movement/down pressure, via the actuator(s), of each rolling basket assembly based on feedback received from the one or more sensors. For example, the one or more sensors may include pressure sensor(s) that detect a pressure of hydraulic fluid inside respective hydraulic actuator(s). Each pressure sensor may output a respective sensor signal indicative of the detected hydraulic fluid pressure to the controller, and the controller may determine the down pressure of the rolling basket(s) based on the detected hydraulic fluid pressure. In response to the determined down pressure being greater than or less than a target pressure/target pressure range, the controller may control each respective hydraulic actuator to increase or decrease the down pressure to equal the target pressure/be within the target pressure range. In this way, the controller may provide consistent down pressure of the rolling basket assemblies while in operation.

The work vehicle may turn (e.g., at a headland), thereby causing the tillage implement to turn as well. Prior to the turn, the disc blade assemblies and the rolling basket assemblies may be lifted (e.g., disengaged from the soil surface) to substantially reduce or eliminate undesirable contact with the soil surface and/or obstructions (e.g., plant debris, rocks) during the turn. For example, the main frame of the tillage implement may be lifted relative to the soil surface to raise the disc blade assemblies. Further, each rolling basket assembly may be rotated/oriented to place the rolling basket assembly in a non-working position. In the present embodiments, the rolling basket assemblies may be raised (e.g., lifted) with sufficient clearance as to avoid undesirable contact with the soil surface and/or obstructions (e.g., plant debris, rocks) during the turn. Additionally, the height of the rolling basket assemblies may be adjusted in coordination with the height adjustment of the main frame (e.g., height adjustment of the other ground engaging tools). In some embodiments, the time to adjust the height of the rolling basket assemblies may be unequal to the time to adjust the height of the main frame and thus the other ground engaging tools. However, the rolling basket position control system 12 of the present embodiments may coordinate a duration (e.g., length of time) of an adjustment transition (e.g., to raise and/or lower, from working to non-working position) of the rolling basket assemblies with a duration of an adjustment transition of other ground engaging tools of the tillage implement. As such, the rolling basket position control system 12, as discussed herein, provides consistency in the adjustment transition may produce a more efficient turn and/or consistent (e.g., even, regular) tillage of the soil surface near the perimeter of the field (e.g., beginnings and/or ends of the rows).

FIG. 1 is a perspective view of an embodiment of an agricultural implement 10 having a rolling basket position control system 12 (e.g., control system) and multiple rolling basket assemblies 14 distributed across a width of the agricultural implement 10. In the illustrated embodiment, the agricultural implement 10 is a vertical tillage implement having multiple ground engaging tools configured to till soil. As illustrated, the agricultural implement 10 includes a main frame 16 and a hitch assembly 18 coupled to the main frame 16. The main frame 16 is formed from multiple frame elements (e.g., rails, tubes, braces, etc.) coupled to one another (e.g., via welded connection(s), via fastener(s), etc.). The hitch assembly 18 may include a hitch frame and a hitch. The hitch frame may be pivotally coupled to the main frame 16 via pivot joint(s), and the hitch may be configured to couple to a corresponding hitch of a work vehicle (e.g., tractor), which may tow the agricultural implement 10 through a field (e.g., along a soil surface) in a forward direction of travel 20. While the hitch frame may be pivotally coupled to the main frame 16 in the illustrated embodiment, in other embodiments, the hitch frame may be movably coupled to the main frame 16 by a linkage assembly (e.g., four bar linkage assembly, etc.) or another suitable assembly/mechanism that enables the hitch to move along a vertical axis 22 relative to the main frame. To facilitate discussion below, the agricultural implement 10 and its respective components may be described with reference to a longitudinal axis 26, the vertical axis 22, which is oriented relative to a direction of gravity, and a lateral axis 24. The longitudinal axis 26 may be generally aligned with the forward direction of travel 20.

As illustrated, the agricultural implement 10 includes wheel assemblies 28 movably coupled to the main frame 16. In the illustrated embodiment, each wheel assembly 28 includes a wheel frame and a wheel rotatably coupled to the wheel frame. The wheels of the wheel assemblies 28 are configured to engage a soil surface 30 of the field, and the wheel assemblies 28 are configured to support at least a portion of the weight of the agricultural implement 10. In the illustrated embodiment, each wheel frame is pivotally coupled to the main frame 16, thereby facilitating adjustment of the position of each wheel along the vertical axis 22. However, in other embodiments, at least one wheel frame may be movably coupled to the main frame 16 by another suitable connection (e.g., sliding connection, linkage assembly, etc.) that facilitates adjustment of the vertical position of the respective wheel(s) along the vertical axis 22. Additionally, in some embodiments, the agricultural implement 10 may include one or more forward wheel assemblies 62 (e.g., one or more gauge wheel assemblies), and a forward wheel actuator 64 may extend from the main frame 16 to each respective forward wheel assembly 62. The forward wheel actuators 64 may be controllably adjusted to change a height of a forward portion of the main frame 16 (e.g., to facilitate height adjustment of the main frame 16, to tilt the main frame 16 about the longitudinal axis 26, etc.).

In the illustrated embodiment, the agricultural implement 10 includes ground engaging tools, including the illustrated disc blade assemblies 32 and the rolling baskets 34 (e.g., crumbler baskets). The disc blade assemblies 32 include one or more disc blades that are configured to engage a top layer of the soil surface 30. As the agricultural implement 10 is towed through the field, the disc blade assemblies 32 are driven to rotate, thereby breaking up the top layer. In the illustrated embodiment, the disc blade assemblies 32 are arranged in two rows. However, in other embodiments, the disc blades may be arranged in more or fewer rows (e.g., 1, 3, 4, 5, 6, or more). In addition, the angle of each row relative to the direction of travel 20 may be selected to control the interaction of the disc blade assemblies 32 with the top layer of soil. Furthermore, as the agricultural implement 10 is towed through the field, the rolling baskets 34 may also engage the top layer of the soil surface 30 and may be driven to rotate, thereby sizing soil clods, leveling the soil surface 30, smoothing the soil surface 30, cutting residue on the soil surface 30, or any combination thereof.

While the illustrated agricultural implement 10 includes the rolling baskets assembly/assemblies 14, the agricultural implement 10 may include other finishing assemblies such as finishing disc assembly/assemblies and/or other suitable type(s) of finishing assembly/assemblies (e.g., alone or in combination with the rolling basket assembly/assemblies). In addition, the finishing assembly/assemblies may include finishing tool(s) such as the rolling baskets 34, the finishing disc(s), other suitable type(s) alone or any combination thereof. Further, in other embodiments, the agricultural implement 10 may include other and/or additional ground engaging tool(s) (e.g., alone or in combination with the disc blade assemblies 32). For example, the agricultural implement 10 may include coulter(s), opener(s), tine(s), other suitable ground engaging tool(s), or a combination thereof. Furthermore, while the agricultural implement 10 is a vertical tillage implement in the illustrated embodiment, in other embodiments, the agricultural implement 10 may be a primary tillage implement or another suitable type of tillage implement.

In the illustrated embodiment, the agricultural implement 10 includes a rolling basket position control system 12 configured to control a position/orientation of the rolling basket assemblies 14 (e.g., to control a vertical position of the rolling baskets 34 along the vertical axis 22 relative to the soil surface 30). The rolling basket position control system 12 may facilitate efficient tillage of the soil surface 30 while the rolling basket assemblies 14 are in a working position and/or may coordinate position/orientation adjustment of the rolling basket assemblies 14 with adjustment of the main frame 16 height to facilitate efficient transportation and/or headland turns of the agricultural implement 10. Each of the rolling basket assemblies 14 includes the rolling basket 34 and a rolling basket frame 36. Each rolling basket 34 is rotatably coupled to a respective rolling basket frame 36, and each rolling basket frame 36 is pivotally coupled to the main frame 16. In addition, the rolling basket position control system 12 includes one or more rolling basket actuators 38 (e.g., hydraulic cylinder(s), double-acting hydraulic cylinder(s), etc.) extending between the main frame 16 and each rolling basket frame 36. When the rolling basket assemblies 14 are in the working position, the rolling basket actuators 38 may be used to urge the rolling basket frames 36 toward the soil surface 30, such that the rolling baskets 34 engage with the top layer of the soil surface 30. As a result, the rolling basket actuators 38 may be used to drive the rolling baskets 34 to engage the soil surface 30 with a target down pressure.

Furthermore, when each rolling basket assembly 14 is in the non-working position, the rolling basket assembly 14 is raised (e.g., lifted) with respect to the vertical axis 22 via the one or more rolling basket actuators 38, such that the rolling basket 34 is positioned a height above the soil surface 30. In this way, the rolling baskets 34 may not be engaged with the soil surface 30 while the rolling basket assemblies 14 are in the non-working position, such as to facilitate the headland turns and/or during transportation of the agricultural implement 10. While the rolling basket frames 36 are pivotally coupled to the main frame 16 in the illustrated embodiment, in other embodiments, at least one rolling basket frame may be movably coupled to the main frame by a linkage assembly (e.g., four bar linkage assembly, etc.) or another suitable assembly/mechanism that enables the rolling basket frame to move vertically relative to the main frame.

In certain embodiments, the rolling basket position control system 12 includes one or more first sensor(s) 40 coupled to the main frame 16 (e.g., proximate to the disc blade assemblies 32). Each of the one or more first sensor(s) 40 may be directed toward the soil surface 30 and configured to emit an output signal toward the soil surface 30 and to receive a return signal indicative of a detected height 42 of the main frame 16 above the soil surface 30. Further, in certain embodiments, the rolling basket position control system 12 includes one or more second sensor(s) 44 coupled to one or more rolling basket assemblies 14 (e.g., proximate to the rolling basket(s) 34). Each of the one or more second sensor(s) 44 may be directed toward the soil surface 30 and configured to emit an output signal toward the soil surface 30 and to receive a return signal indicative of a detected height 46 of the rolling basket 34 above the soil surface 30.

While the one or more first sensor(s) 40 are positioned proximate to the disc blade assemblies 32 in the illustrated embodiment, in other embodiments, at least one first sensor 40 may be positioned proximate to other suitable ground engaging tool(s) (e.g., first ground engaging tool(s)). For example, at least one first sensor 40 may be positioned proximate to one or more coulters, one or more tillage point assemblies, one or more finishing discs, one or more openers, one or more tines, or one or more blades, among other suitable ground engaging tool(s). In certain embodiments, a single sensor (e.g., the first sensor 40) may be positioned at (e.g., coupled to) any suitable location on the implement frame 16 (e.g., the longitudinal center of the implement frame). The single sensor may be the only sensor of the agricultural implement 10 configured to provide feedback indicative of the detected height 42 of the main frame 16.

Furthermore, in the illustrated embodiment, the rolling basket position control system 12 includes one or more main frame actuator(s) 48, in which each main frame actuator 48 is coupled to the main frame 16 and to the wheel frame of at least one wheel assembly 28. The one or more main frame actuator(s) 48 may be configured to control one or more positions of the wheel assembly/assemblies 28 relative to the main frame 16 along the vertical axis 22, and thus control a height of the main frame 16 above the soil surface. In this way, the one or more main frame actuator(s) 48 may additionally control the penetration depth of the disc blade assemblies 32 in relation to the soil surface 30. While the rolling basket position control system 12 of the illustrated embodiment includes three main frame actuators 28, in other embodiments, the rolling basket position control system 12 may include more or fewer main frame actuator(s) 48 extending between the main frame 16 and the wheel assembly/assemblies 28.

In certain embodiments, each main frame actuator 48 may be configured to move the respective wheel assembly/assemblies 28 from a retracted position (e.g., in which the wheel assembly/assemblies 28 are raised, and the main frame 16 is lowered) to an extended position (e.g., in which the wheel assembly/assemblies 28 are lowered, and the main frame 16 is raised). When the one or more wheel assembly/assemblies 28 are in the extended position, the disc blade assembly/assemblies 32 of the agricultural implement 10 are raised and disengaged from the soil surface 30 (e.g., to facilitate transport, inspection of the agricultural implement 10, a headland turn, etc.). Each main frame actuator 48 may move the respective wheel assembly/assemblies 28 from the extended position to the retracted position, thereby causing the disc blade assemblies 32 to lower and engage the soil surface 30. Once the one or more disc blade assembly/assemblies 32 are engaged with the soil surface 30, the work vehicle may tow the agricultural implement 10 through the field to till the soil. In some embodiments, the position of the main frame 16 may be determined by the one or more forward wheel actuator(s) 64. The forward wheel actuator(s) 64, as discussed herein, may be controllably extended or retracted to change a height of a forward portion of the main frame 16 with respect to the direction of travel 20 (e.g., to facilitate height adjustment of the main frame 16, to tilt the main frame 16 about the longitudinal axis 26, etc.). Further, the one or more forward wheel actuator(s) 64 may be controllably extended or retracted alone or in combination with the one or more main frame actuator(s) 48 to produce the target main frame height and/or target position (e.g. tilt, slope, angle) of the main frame 16. In addition, in some embodiments, the agricultural implement 10 may include one or more other actuator(s) (e.g., hitch position actuator) that may be controlled alone or in combination with the main frame actuator(s) 48 and/or the forward wheel actuator(s) 64 to produce a target main frame height and/or target position of the main frame 16 during operations.

The coordination of the vertical position of the rolling baskets 34 (e.g., height 46 of the rolling baskets 34) via the rolling basket position control system 12 with the position of the main frame 16 (e.g., height 42 of the main frame 16) to facilitate an efficient transition from the working position to the non-working position, and vice versa, (e.g., for the headland turn and/or for transportation of the agricultural implement 10) will be discussed in more detail below with respect to FIGS. 2 and 3.

Figure 2:
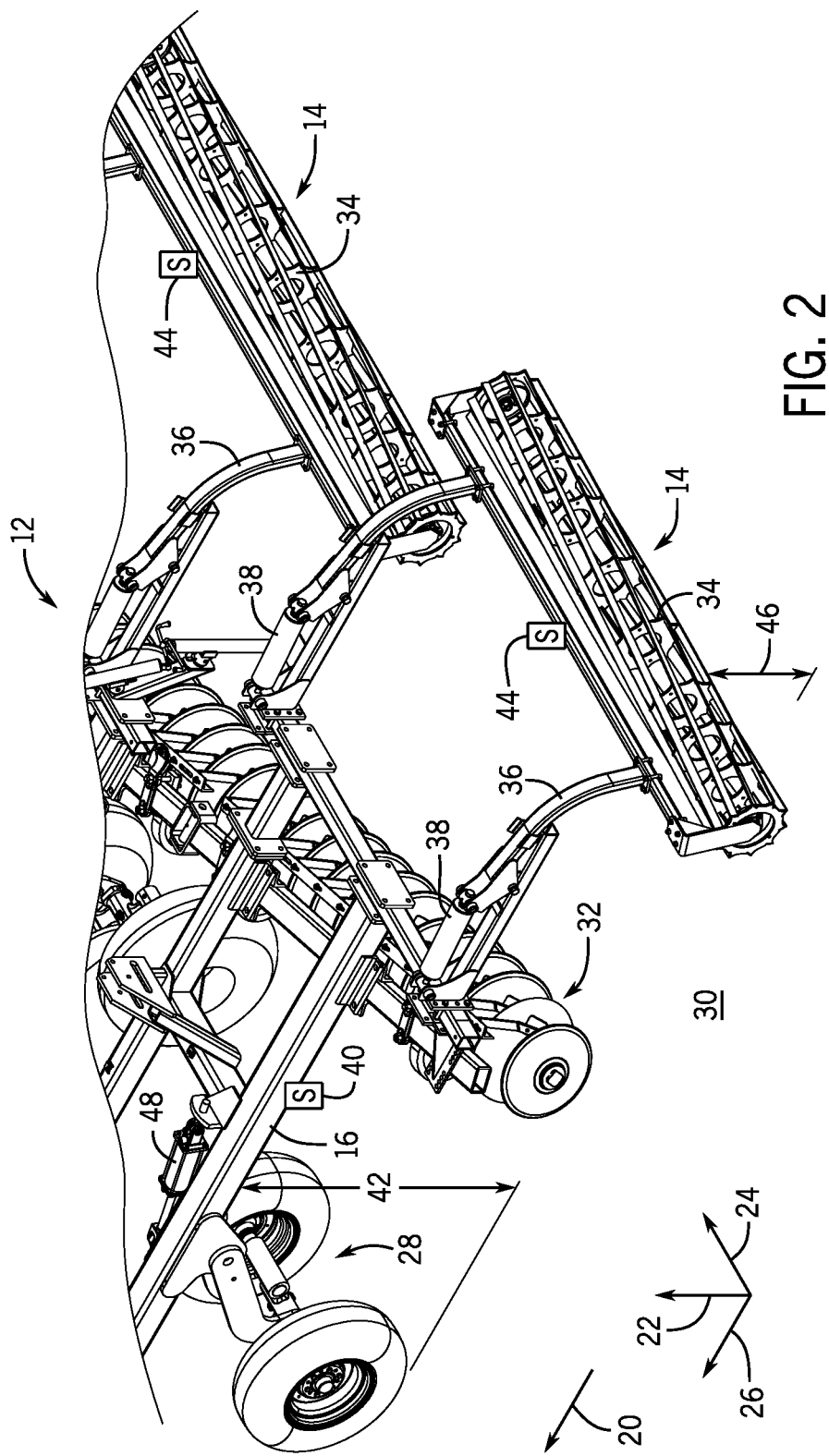
FIG. 2 is a perspective view of the rolling basket position control system of FIG. 1, in accordance with an embodiment of the present disclosure.
Figure 3:
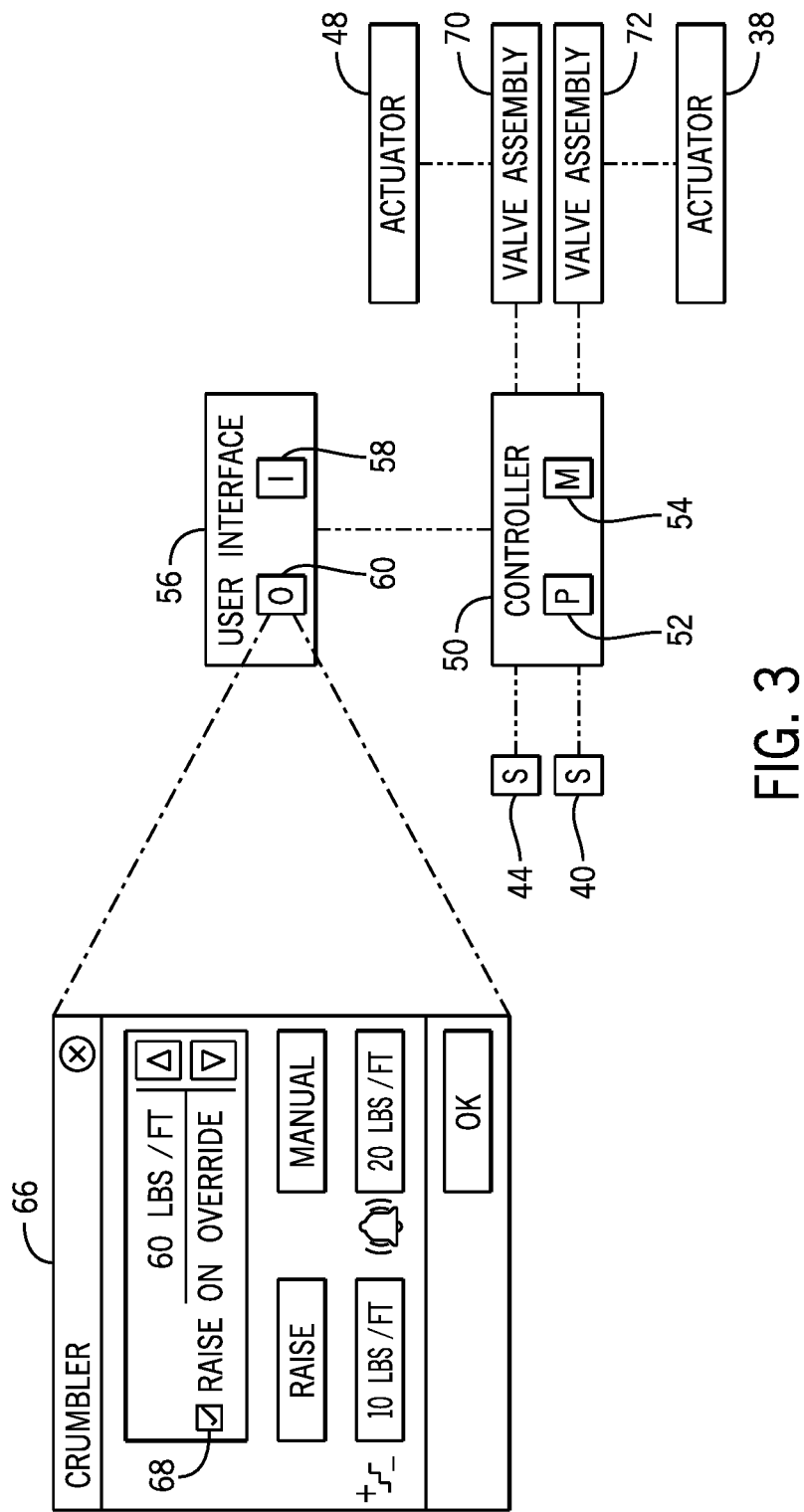
FIG. 3 is a schematic view of an embodiment of the rolling basket position control system of FIG. 1, in accordance with an embodiment of the present disclosure.

FIG. 2 is a perspective view of the rolling basket position control system 12 as discussed in FIG. 1, and FIG. 3 is a schematic view of an embodiment of the rolling basket position control system 12 of FIG. 1. To facilitate discussion, FIGS. 2 and 3 will be described together below. As illustrated in FIG. 3, the rolling basket position control system 12 includes a controller 50 communicatively coupled to the one or more main frame actuator(s) 48, to the one or more rolling basket actuator(s) 38, to the one or more first sensor(s) 40, and to the one or more second sensor(s) 44. In some embodiments, the controller 50 may be communicatively coupled the one or more forward wheel actuator(s) 64. The controller 50 may receive one or more signals from the first sensor(s) 40 and/or the second sensor(s) 44 which are indicative of the height 42 of the main frame 16 above the soil surface 30 and/or the height 46 of the rolling basket(s) 34 above the soil surface 30, respectively. In addition, the controller 50 may control the vertical position (e.g., height) of the main frame 16 and/or the rolling basket(s) 34 relative to the soil surface 30 during one or more modes of operation and/or during transition(s) between modes of operation of the agricultural implement 10. For example, the controller 50 may control the vertical position of the main frame 16 and/or the rolling basket(s) 34 when the agricultural implement is in the working operation mode, the non-working operation mode, transitioning from the working operation mode to the non-working operation mode (e.g., prior to the headland turn and/or transportation of the agricultural implement 10), transitioning from the non-working operation mode to the working operation mode (e.g., following completion of the headland turn and/or beginning the tillage of the soil surface 30), or a combination thereof.

For example, in some embodiments, the controller 50 may control the main frame actuator(s) 48 to change the position of the wheel assemblies 28 in relation to the main frame 16. In this way, during the working operation mode, the controller 50 may adjustably control the penetration depth of the disc blade assemblies 32 coupled to the main frame 16 to establish a target penetration depth. In addition, the controller 50 may control the rolling basket actuators 38. In this way, during the working operation mode, the controller 50 may adjustably control the down pressure applied by the rolling basket(s) 34 to the soil surface to establish a target down pressure. Further, during the non-working operation mode, the controller 50 may control the main frame actuator(s) 48 and/or the rolling basket actuator(s) 38 to drive the main frame 16 to raise to a target height and to drive the rolling basket(s) to raise to a target height, respectively, so as to position the ground engaging tools at a target height (e.g., height clearance) above the soil surface 30. As a result, the ground engaging tools may not be in contact with the soil surface 30 and may be stowed in a non-working position, such that the agricultural implement 10 may be transported and/or complete a headland turn without unintentional contact between the ground engaging tools and the soil surface 30 and/or debris that may be located outside of the perimeter of the field.

In the illustrated embodiment, the main frame actuator(s) 48 include hydraulic cylinder(s) configured to control the position of the wheel assembly/assemblies 28 in relation to the main frame 16 along the vertical axis 22. In addition, the rolling basket position control system 12 includes a first valve assembly 70 configured to control a flow of fluid (e.g., hydraulic fluid) to the main frame actuator(s) 48/hydraulic cylinder(s). Accordingly, the controller 50 may be communicatively coupled to the main frame actuator(s) 48 via the first valve assembly 70. The first valve assembly 70 may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the main frame actuator(s) 48/hydraulic cylinder(s) (e.g., from a fluid source) and, in certain embodiments, from the main frame actuator(s) 48/hydraulic cylinder(s) (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the main frame actuator(s) 48 include hydraulic cylinder(s) in the illustrated embodiment, in certain embodiments, the main frame actuator(s) 48 may include any other suitable type(s) of actuator(s) (e.g., alone or in combination with the hydraulic cylinder(s)), such as hydraulic motor(s), pneumatic cylinder(s), pneumatic motor(s), electromechanical actuator(s), linear actuator(s), screw drive(s), etc. In embodiments in which the actuator(s) are controlled by fluid (e.g., air, hydraulic fluid, etc.), the actuator(s) may be communicatively coupled to the controller via an appropriate valve assembly. Furthermore, in embodiments in which the actuator(s) are controlled by electrical signals, the actuator(s) may be electrically coupled to the controller.

Additionally, the rolling basket actuator(s) 38 may include hydraulic cylinder(s) configured to control the position of the rolling baskets 34 in relation to the soil surface 30 along the vertical axis 22. In addition, the rolling basket position control system 12 includes a second valve assembly 72 configured to control a flow of fluid (e.g., hydraulic fluid) to the rolling basket actuator(s) 38/hydraulic cylinder(s). Accordingly, the controller 50 may be communicatively coupled to the rolling basket actuator(s) 38 via the second valve assembly 72. The second valve assembly 72 may include any suitable number and/or type(s) of valve(s) (e.g., proportional control valve(s), gate valve(s), check valve(s), needle valve(s), etc.) and other suitable component(s) (e.g., hose(s), fluid passage(s), solenoid(s), etc.) to control the flow of fluid to the rolling basket actuator(s) 38/hydraulic cylinder (e.g., from a fluid source) and, in certain embodiments, from the rolling basket actuator(s) 38/hydraulic cylinder (e.g., to a fluid tank, etc.). The valve assembly may be located on the agricultural implement, the valve assembly may be located on the work vehicle towing the agricultural implement, or the valve assembly may be distributed between the agricultural implement and the work vehicle. While the rolling basket actuator(s) 38 include hydraulic cylinder(s) in the illustrated embodiment, in other embodiments, the rolling basket actuator(s) 38 may include any other suitable type(s) of actuator(s) (e.g., alone or in combination with the hydraulic cylinder(s)), such as hydraulic motor(s), pneumatic cylinder(s), pneumatic motor(s), electromechanical actuator(s), linear actuator(s), screw drive(s), etc. In embodiments in which the actuator(s) are controlled by fluid (e.g., air, hydraulic fluid, etc.), the actuator(s) may be communicatively coupled to the controller via an appropriate valve assembly. Furthermore, in embodiments in which the actuator(s) are controlled by electrical signals, the actuator(s) may be electrically coupled to the controller.

Furthermore, in some embodiments, the controller 50 may be located in/on the agricultural implement 10. However, in other embodiments, the controller 50 may be located in/on the work vehicle coupled to the agricultural implement 10. Furthermore, in certain embodiments, one or more functions of the controller 50 may be distributed across multiple control devices (e.g., the control devices forming the controller). In certain embodiments, the controller 50 is an electronic controller having electrical circuitry configured to control the main frame actuator(s) 48 and/or the rolling basket actuator(s) 38. As illustrated in FIG. 3, the controller 50 includes a processor 52, such as a microprocessor, and a memory device 54. The controller 50 may also include one or more storage devices and/or other suitable components. The processor 50 may be used to execute software, such as software for controlling the main frame actuator(s) 48 and/or the rolling basket actuator(s) 38. Moreover, the processor 50 may include multiple microprocessors, one or more "general-purpose" microprocessors, one or more special-purpose microprocessors, and/or one or more application specific integrated circuits (ASICS), or some combination thereof. For example, the processor 50 may include one or more reduced instruction set (RISC) processors.

The memory 54 may include a volatile memory, such as random access memory (RAM), and/or a nonvolatile memory, such as read-only memory (ROM). The memory 54 may store a variety of information and may be used for various purposes. For example, the memory 54 may store processor-executable instructions (e.g., firmware or software) for the processor 52 to execute, such as instructions to control the main frame actuator(s) 48 and/or the rolling basket actuator(s) 38, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., the target down pressure), instructions (e.g., software or firmware for controlling the main frame actuator(s) 48 and/or the rolling basket actuator(s) 38, etc.), and any other suitable data. For example, the storage device(s) may store data, such as the target penetration depth/target penetration depth range for the disc blades and/or target down pressure/target down pressure range for the rolling baskets during operation of the agricultural implement 10.

In the illustrated embodiment, the rolling basket position control system 12 also includes a user interface 56 communicatively coupled to the controller 50. The user interface 56 is configured to receive input from an operator (e.g., a human operator) and to provide information to the operator. The user interface 56 may include any suitable input device(s) 58 for receiving input, such as a keyboard, a mouse, touch screen(s), button(s), switch(es), knob(s), other suitable input device(s), or any combination thereof. In addition, the user interface 56 may include any suitable output device(s) 60 for presenting information to the operator, such as speaker(s), indicator light(s), display(s), other suitable output device(s), or any combination thereof. For example, the user interface 56 may enable the operator to provide inputs to set the target penetration depth and/or the target down pressure, and/or to control the main frame actuator(s) 48 and/or the rolling basket actuator(s) 38. Additionally or alternatively, the user interface 56 may present the target penetration depth for the disc blades and/or the target down pressure for the rolling basket(s), a current penetration depth of the disc blades and/or down pressure of the rolling basket(s), an indication of whether the current penetration depth and/or down pressure meets (e.g., is within a threshold range of) the respective target penetration depth and/or the target down pressure, an indication of a current position of the main frame 16 and/or the rolling basket assembly/assemblies (e.g., working position or non-working position), and/or a current control instruction being output to the main frame actuator(s) 48 and/or the one or more rolling basket actuator(s) 38.

In the illustrated embodiment, the output device 60 (e.g., such as a display) may present an image, such as the illustrated crumbler window 66, which may provide information pertaining to the rolling basket assembly/assemblies 14, such as the illustrated selectable target down pressure (e.g., 60 lbs/ft), selectable notification settings, and the "raise on override" selectable checkbox 68. Additionally, the crumbler window 66 may enable the operator to provide inputs regarding the rolling basket assembly/assemblies 14. For example, the "raise on override" checkbox 68 may enable the operator to selectively activate or deactivate the automatic coordination of the adjustment of the rolling basket assembly/assemblies 14 with the adjustment of the main frame 16 from the working operation mode (e.g., the working position) to the non-working operation mode (e.g., the non-working position), and vice versa.

Furthermore, during the working operation mode, the main frame actuator(s) 48 and the rolling basket actuator(s) 38 may be selectively controlled (e.g., adjusted) to establish the target penetration depth of the disc blade assemblies 32 and/or the target down pressure of the disc blade assemblies 32/rolling basket(s) 34, respectively. For example, in certain embodiments, each rolling basket actuator 38 may increase the down pressure of the respective rolling basket 34, and each rolling basket actuator 38 may decrease the down pressure of the respective rolling basket 34. In addition, each rolling basket actuator 38 may retract to move the respective rolling basket assembly 14 to the non-working position, and each rolling basket actuator 38 may extent to move the respective rolling basket assembly 14 to the working position. Additionally, each main frame actuator 48 may extend to move the main frame 16 to the non-working position, and each main frame actuator 48 may retract to move the main frame 16 to the working position. Further, in some embodiments, the frame actuator(s) 48 and the rolling basket actuator(s) 38 may be selectively controlled (e.g., adjusted) independently of each other to establish the target penetration depth of the disc blade assemblies 32 and the target down pressure of the disc blade assemblies 32 rolling baskets 34, respectively. For example, as the agricultural implement 10 traverses a field, the controller 50 may control the main frame actuator(s) 48 to selectively increase or decrease the penetration depth of the disc blade assemblies 32 while substantially maintaining the down pressure of the rolling basket(s) 34. Additionally or alternatively, as the agricultural implement 10 traverses the field, the controller 50 may control the rolling basket actuator(s) 38 to selectively increase or decrease the down pressure of the rolling basket(s) 34 while substantially maintaining the penetration depth of the disc blade assemblies 32.

Furthermore, during the working operation mode, the main frame actuator(s) 48 and the rolling basket actuator(s) 38 may be controlled in coordination with each other, such as to establish the target penetration depth of the disc blade assemblies 32 and the target down pressure of the rolling basket(s) 34. In addition, the main frame actuator(s) 48 and the rolling basket actuator(s) 38 may be controlled in coordination with each other so as to facilitate a consistent and effective transition from the working operation mode to the non-working operation mode (e.g., to enable an efficient and effective headland turn and/or transport) and/or from the non-working operation mode to the working operation mode.

As illustrated in FIG. 3, the controller 50 is also communicatively coupled to the first sensor 40 and the second sensor 44. In some embodiments, the controller 50 may be communicatively coupled to a sensor assembly including the first and second sensors 40, 44. The first and second sensors 40, 44 may output signals via a wired or wireless connection to the controller 50. The first and second sensors 40, 44 may send signals (e.g., data) to the controller 50. The first sensor signal(s) from the first sensor(s) 40 are indicative of the position (e.g., height) of the main frame 16 relative to the soil surface, and the second sensor signal(s) from the second sensor(s) 44 are indicative of the position (e.g., height) of the rolling basket(s) relative to the soil surface. For example, the first and second sensors 40, 44 may be position sensors (e.g., infrared sensor(s), radio detection and ranging (RADAR) sensor(s), light detection and ranging (LIDAR) sensor(s), ultrasonic sensor(s), capacitive sensor(s), etc.) positioned along a structure of the main frame 16 and the rolling basket 34, respectively, and directed toward the soil surface 30. As discussed herein, the first and second sensors 40, 44 may output signals toward the soil surface 30 and receive return signals from the soil surface 30 to detect (e.g., measure) a height of the first and second sensors 40, 44 above the soil surface 30. It should be appreciated that the first sensor(s) 40 and the second sensor(s) 44 may include any suitable type(s) of sensor(s) configured to emit an output signal toward the soil surface and to receive a return signal indicative of a distance between the sensor and the soil surface.

In some embodiments, the first sensor(s) 40 may detect a position of the wheel(s) (e.g., the wheel assembly/assemblies 28) relative to the main frame 16, which may be used to determine the height 42 of the main frame 16 above the soil surface 30. In particular, the first sensor(s) 40 may be integrated with the main frame actuator(s) 48 and configured to detect the position (e.g., extension, retraction) of the main frame actuator(s) 48, which in turn, would indicate the position of the wheel(s) (e.g., the wheel assembly/assemblies 28) relative to the main frame 16. For example, the first sensor(s) 40 may be a linear potentiometer, rotary potentiometer, a linear variable differential transformer (LVDT), a Hall effect sensor, or any combination thereof. Further, the position(s) of the wheel(s) monitored by the first sensor(s) 40 may correspond (e.g., via calibration) to the height(s) 42 of the main frame 16 above the soil surface 30, such that when the first sensor(s) 40 detects a change (e.g., adjustment, extension, retraction) in the position of the main frame actuator 48 (e.g., adjustment of the position of the wheel(s) relative to the main frame 16), the first sensor(s) 40 may send a signal to the controller 50 indicating the change in position of the wheels relative to the main frame 16. In some embodiments, the first sensor(s) 40 may continuously or intermittently send signals to the controller 50 indicative of the position of the wheels relative to the main frame 16. The controller 50, via a processor(s), may use the signal(s) to determine (e.g., calculate) a height adjustment (e.g., increase, decrease) in the height 42 of the main frame 16 in relation to the soil surface 30. In some embodiments, as further discuss herein, when the height adjustment of the main frame 16 (e.g., change in the position of the wheel(s) relative to the main frame 16) exceeds a threshold change amount, the controller 50 may determine that the agricultural implement 10 is transitioning from the working mode of operation to the non-working mode of operation, or vice versa.

In certain embodiments, the first sensor(s) and/or the second sensor(s) 40, 44 may include an infrared sensor configured to emit an infrared signal toward the soil surface and to receive a return infrared signal from the soil surface. Furthermore, in certain embodiments, the first sensor(s) and/or the second sensor(s) 40, 44 may include a radio detection and ranging (RADAR) sensor (e.g., millimeter wave (MMW) scanner, etc.) configured to emit a radio frequency signal toward the soil surface and to receive a return radio frequency signal from the soil surface. In addition, in certain embodiments, the first sensor(s) and/or the second sensor(s) 40, 44 may include a LIDAR sensor (e.g., time-of-flight scanning laser, etc.) configured to emit a light signal toward the soil surface and to receive a return light signal from the soil surface. By way of further example, in certain embodiments, the first sensor(s) and/or the second sensor(s) 40, 44 may include an ultrasonic sensor configured to emit an ultrasonic signal toward the soil surface and to receive a return ultrasonic signal from the soil surface. Furthermore, in certain embodiments, the first sensor(s) and/or the second sensor(s) 40, 44 may include a capacitive sensor configured to emit an electric signal/field toward the soil surface and to receive a return electric signal from the soil surface (e.g., in the form of a change to the emitted electric signal/field). While the first sensor(s) and the second sensor(s) 40, 44 are non-contact sensors (e.g., configured to emit an output signal and to receive a return signal) in certain embodiments disclosed herein, in other embodiments, the first sensor(s) and/or the second sensor(s) 40, 44 may be contact sensor(s) (e.g., including a ground contact element) configured to monitor the height of the main frame 16/rolling basket(s) 34 above the soil surface 30.

During the working operation mode, the first sensor(s) 40 may output signals (e.g., data) to the controller 50, and the signals are indicative of a detected height 42 of the main frame 16 above the soil surface. Based on the detected height 42 of the main frame 16, the controller 50 may determine a detected penetration depth of the disc blade assemblies 32. Further, the controller 50 may then determine whether the detected penetration depth of the disc blade assemblies 32 meets (e.g., is within a threshold range of) the target penetration depth or is within the target penetration depth range, and the controller 50 may control the main frame actuator(s) 48 accordingly. For example, if the determined penetration depth meets the target penetration depth or is within the target penetration depth range, the controller 50 may not control the main frame actuator(s) 48. However, if the determined penetration depth does not meet the target penetration depth or does not fall within the target penetration depth range, the controller 50 may control the main frame actuator(s) 48 to adjust (e.g., increase or decrease) the penetration depth until the target penetration depth is obtained or until the determined penetration depth is within the target penetration depth range.

In some embodiments, the rolling basket position control system 12 may include one or more additional sensors. For example, the one or more additional sensors may include pressure sensor(s) (e.g., strain gauge(s), load cell(s), hydraulic fluid pressure sensor(s), etc.) configured to monitor the down pressure applied by the rolling basket(s) 34 to the soil surface. The pressure sensor(s) may include strain gauge(s) coupled to one or more rolling basket frame(s) 36, load cell(s) coupled to one or more rolling basket actuator(s) 38, hydraulic fluid pressure sensor(s) in fluid communication with hydraulic rolling basket actuator(s), other suitable sensor(s), or a combination thereof. The pressure sensor(s) may output signals (e.g., data) to the controller 50, and the signals may be indicative of a force applied by the rolling basket assembly/assemblies 14, which is indicative of the down pressure applied to the surface of the soil by the respective disc blade assemblies 32/rolling baskets 34. The controller 50 may determine the down pressure based on the signals, and the controller 50 may control the rolling basket actuator(s) 38 to adjust (e.g., increase or decrease) the down pressure until the target down pressure is obtained or the down pressure is within the target down pressure range.

In addition, in some embodiments, the controller 50 may continuously or periodically (e.g., at a selected frequency) receive the signals and control the main frame actuator(s) 48 and the rolling basket actuator(s) 38 (e.g., dynamically, responsively) as the agricultural implement 10 travels through the field. In this way, during tillage operations, the controller 50 may respond to the determined penetration depth and the determined down pressure to actively maintain the determined penetration depth and the determined down pressure to meet the target penetration depth/to be within the target penetration depth range and to meet the target down pressure/to be within the target down pressure range. While monitoring and controlling the penetration depth of the disc blades and the down pressure of the rolling baskets is disclosed above, in certain embodiments, the controller may only control one of the penetration depth or the down pressure. Furthermore, in certain embodiments, the controller may not control the penetration depth, and the controller may not control the down pressure. In addition, in certain embodiments, the controller may control other suitable parameters associated with operation of the tillage implement.

In some embodiments, the controller 50 may transition the agricultural implement 10 from the working operation mode to the non-working operation mode for transport and/or to conduct a headland turn at the perimeter of the field. The controller 50 may also transition the agricultural implement from the non-working operation mode to the working operation mode. As such, the controller 50 of the rolling basket position control system 12 may transition the ground engaging tools (e.g., disc blade assemblies 32 and rolling baskets 34) from the working position to the non-working position and/or from the non-working position to the working position. For example, in some embodiments, the controller 50 of the rolling basket position control system 12 may detect an indication of a desired transition from the working operation mode to the non-working operation mode from an operator of the agricultural implement 10. The indication may be received by the controller 50 via user interface 56, in which the operator of the agricultural implement 10 provides one or more inputs to the input device(s) 58 of the user interface 56. In response to receiving the indication of the desired transition from the working operation mode to the non-working operation mode, the controller 50 may send signals to instruct the main frame actuator(s) 48 to raise the main frame 16 and thus raise the ground engaging tool(s) coupled to the main frame 16.

In some embodiments, the controller 50 of the rolling basket position control system 12 may detect the indication of a desired transition from the working operation mode to the non-working operation mode or from the non-working operation mode to the working operation mode. For example, the controller 50 of the rolling basket position control system 12 may receive a signal indicative of a geographical position of the agricultural implement 10 via one or more location sensors positioned on the agricultural implement 10 and/or the work vehicle. A geo-fenced boundary may correspond to the perimeter of a field to be worked by the agricultural implement 10 and may be stored within the memory 54 of the controller 50. In some embodiments, the controller 50 of the rolling basket position control system 12 may determine that the geographical position of the agricultural implement 10 is within a threshold distance from the geo-fenced boundary and as a result, may determine that the agricultural implement 10 may be transitioned from the working operation mode to the non-working operation mode, such as when the geographic position of the agricultural implement 10 is inside of the geo-fenced boundary and within the threshold distance from the geo-fenced boundary. In response to determining the transition from the working operation mode to the non-working operation mode, the controller 50 may send signals to instruct the main frame actuator(s) 48 to raise the main frame 16 and thus raise the ground engaging tool(s) coupled to the main frame 16. In addition, the controller 50 may determine that the agricultural implement 10 may be transitioned from the non-working operation mode to the working operation mode, such as when the geographic position of the agricultural implement 10 is outside of the geo-fenced boundary and within the threshold distance from the geo-fenced boundary. In response to determining the transition from the non-working operation mode to the working operation mode, the controller 50 may send signals to instruct the main frame actuator(s) 48 to lower the main frame 16 and thus lower the ground engaging tool(s) coupled to the main frame 16.

Additionally, in some embodiments, the indication of the desired transition from the working operation mode to the non-working operation mode, or vice versa, may be received by the controller 50 via the operator activating one or more valve assemblies to increase the vertical position of the main frame 16 of the agricultural implement 10 (e.g., via the main frame actuator(s) 48). Moreover, as discussed herein, the controller 50 of the rolling basket position control system 12 may automatically coordinate the vertical position adjustment of the rolling basket(s) 34 of the rolling basket assembly/assemblies 14 with the adjustment of the height 42 of the main frame 16 during the transition of the agricultural implement 10 from the working operation mode to the non-working operation mode. For example, in some embodiments, the controller 50 may detect that the operator of the agricultural implement 10 has activated one or more valve assemblies to cause the main frame actuator(s) 48 to raise the main frame 16 (e.g., via lowering the wheel assembly/assemblies 28) until the disc blade assemblies 32 are disengaged from the soil surface 30. Additionally, the height 46 of the rolling basket(s) 34 above the soil surface 30 may increase as the height 42 of the main frame 16 above the soil surface 30 increases. However, in some embodiments, due to an angle of tilt of the main frame 16 from the front to the back relative to the direction of travel 20 and/or the rolling basket actuator(s) 38 urging the rolling basket(s) 34 toward the soil surface 30, the rolling basket(s) 34 may not be raised via raising of the main frame 16 to provide sufficient clearance above the soil surface 30 and/or above obstacles on the soil surface. Therefore, the controller 50 of the rolling basket position control system 12 may raise the basket assembly/assemblies 14 to the non-working position via the rolling basket actuator(s) 38 in response to determining that the height increase of the main frame 16 exceeds a threshold height adjustment value (e.g., 65 mm, 75 mm, 85 mm, 95 mm, 75-100 mm, increase from the height 42 of the main frame 16 while the main frame 16 is in the working position/the disc blade assemblies 32 are engaged with the soil surface 30). In this way, the rolling basket position control system 12 may position the rolling baskets 34 in the raised/non-working position during (e.g., only during) a transition from the working operation mode to the non-working operation mode.

As discussed herein, the duration of time to adjust the height of the rolling basket assembly/assemblies 14 may be unequal to the duration of time to adjust the height of the main frame 16 and thus the other ground engaging tools. Therefore, the threshold height adjustment value may be dependent on the duration associated with re-lowering the rolling basket assembly/assemblies 14 (e.g., the rolling basket(s) 34) from the working position to the working position by extending the rolling basket actuator(s) 38 (e.g., such as following the headland turn). In this way, the controller 50 (e.g., rolling basket position control system 12) may effectively coordinate the vertical position adjustment of the rolling basket(s) 34 of the rolling basket assembly/assemblies 14 with the adjustment of the height 42 of the main frame 16 during the transition of the agricultural implement 10 from the working operation mode to the non-working operation mode. In addition, the controller 50 may provide sufficient time for the rolling basket actuator(s) 38 to transition the rolling basket assembly/assemblies 14 from the non-working position to the working position, such that the rolling basket(s) 34 engage with the soil surface 30 as substantially the same time as the disc blade assembly/assemblies 32.

Further, in some embodiments, in response to determining that the height increase of the main frame 16 exceeds the threshold height adjustment value, the controller 50 of the rolling basket position control system 12 may receive the signals from the second sensor(s) 44 coupled to the rolling basket assembly/assemblies 14, which are indicative of the height(s) 46 of the rolling basket(s) 34 above the soil surface 30. The controller 50 of the rolling basket position control system 12 may then determine if the height(s) 46 of the basket(s) 34 are less than a threshold height above the soil surface (e.g., 65 mm, 75 mm, 85 mm, 95 mm, 75-100 mm from the surface) and control respective rolling basket actuator(s) 38 to raise the respective rolling basket(s) 34 (e.g., via retracting respective rolling basket actuator(s) 38) in response to determining the height(s) of the basket(s) are less than the threshold height. In this way, the controller 50 may actively detect the vertical position(s) (e.g., height(s)) of the rolling basket(s) 34 above the surface and increase the vertical position(s) (e.g., height(s) 46) of the rolling basket(s) 34 to avoid undesirable contact of the rolling basket(s) 34 with the soil surface and/or objects on the soil surface (e.g., rock(s), debris, etc.). In some embodiments, the rolling basket position control system 12 may receive the signals from the second sensor(s) 44 coupled to the rolling basket assembly/assemblies 14 in response to detecting the indication of the desired transition, as discussed herein, of the agricultural implement 10 from the working to the non-working operation mode. The controller 50, as discussed herein, may then actively detect the vertical position(s) (e.g., height(s)) of the rolling basket(s) 34 above the surface and increase the vertical position(s) (e.g., height(s) 46) of the rolling basket(s) 34 to avoid undesirable contact of the rolling basket(s) 34 with the soil surface and/or objects on the soil surface (e.g., rock(s), debris, etc.). Furthermore, in some embodiments, the controller 50 may independently adjust each respective height 46 of each respective rolling basket 34 by the methods discussed herein in response to receiving signal(s) from a respective second sensor 44. Alternatively, the controller 50 may equally adjust all heights 46 of all rolling basket(s) 34 in response to receiving signal(s) from one or more second sensor(s) 44.

In addition, the controller 50 of the rolling basket position control system 12 may automatically coordinate the vertical position adjustment of the rolling basket(s) 34 of the rolling basket assembly/assemblies 14 with the adjustment of the height 42 of the main frame 16 during the transition of the agricultural implement 10 from the non-working operation mode to the working operation mode. First, the controller 50 of the rolling basket position control system 12 may detect the indication of the desired transition from the non-working operation mode to the working operation mode. For example, in some embodiments, the controller 50 may detect that the operator of the agricultural implement 10 has manually activated one or more valve assemblies to cause the main frame actuator(s) 48 to lower the main frame 16 (e.g., via raising the wheel assembly/assemblies 28) until the main frame 16 is in the working position (e.g., the disc blade assemblies 32 are engaged with the soil surface 30). Additionally, the height 46 of the rolling basket(s) 34 above the soil surface 30 may decrease as the height 42 of the main frame 16 above the soil surface 30 decreases. Because the rolling basket(s) 34 are in the non-working position (e.g., the rolling basket actuator(s) 38 are retracted) prior to the detection of the indication of the desired transition, the rolling basket(s) 34 may be lowered to the working position to facilitate engagement with the soil surface 30. A duration associated with lowering the rolling basket(s) 34 (e.g., via extension of the rolling basket actuator(s) 38) to the working position may be different than a duration associated with lowering the disc blade assemblies 32/main frame 16 to the working position. Therefore, in some embodiments, the controller 50 may lower the rolling basket(s) 34 to the working position (e.g., via controlling the rolling basket actuator(s) 38) in response to determining that the decrease in height of the main frame 16 exceeds a second threshold height adjustment value (e.g., 10 mm, 25 mm, 35 mm, 20-40 mm) decrease from the non-working position height/maximum height of the main frame 16). In this way, the controller 50 may automatically lower the rolling basket(s) 34 concurrently with the disc blade assemblies 32 during the transition from the non-working operation mode to the working operation mode. For example, the initiation of the lowering of the rolling basket(s) 34 may be automatically coordinated with the lowering of the disc blade assemblies 32, such that both the rolling basket(s) 34 and the disc blade assemblies 32 engage the soil surface 30 at substantially the same time.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A finishing tool position control system for an agricultural implement, comprising:
    a controller comprising a memory and a processor, wherein the controller is configured to control a height of a finishing tool of a finishing assembly above a soil surface;
    an actuator communicatively coupled to the controller, wherein the actuator is configured to be coupled to the finishing assembly and to control a position of the finishing assembly relative to a main frame of the agricultural implement; and
    a sensor assembly, comprising:
        a first sensor communicatively coupled to the controller and configured to output a first signal indicative of a height of the main frame of the agricultural implement above the soil surface, wherein the controller is configured to receive the first signal and to adjust, via the actuator, the position of the finishing assembly relative to the main frame to increase the height of the finishing tool above the soil surface in response to determining that an increase in the height of the main frame above the soil surface exceeds a threshold height adjustment; or
        a second sensor communicatively coupled to the controller and configured to output a second signal indicative of the height of the finishing tool of the finishing assembly above the soil surface, wherein the controller is configured to receive the second signal and to increase adjust, via the actuator, the position of the finishing assembly relative to the main frame to increase the height of the finishing tool above the soil surface in response to determining that the agricultural implement is in a non-working operation mode and the height of the finishing tool above the soil surface is less than a threshold value.

2. The finishing tool position control system of claim 1, comprising a valve assembly configured to control a flow of fluid to the actuator, wherein the controller is communicatively coupled to the actuator via the valve assembly, and the actuator comprises a double-acting hydraulic cylinder.

3. The finishing tool position control system of claim 1, wherein the threshold height adjustment is 75 mm.

4. The finishing tool position control system of claim 1, wherein the non-working operation mode is determined, via the controller, based on the height of the main frame exceeding the threshold height adjustment, and wherein the threshold value is 75 mm.

5. The finishing tool position control system of claim 1, wherein the sensor assembly comprises the first sensor, and wherein the controller is configured to decrease the height of the finishing tool above the soil surface in response to determining that the agricultural implement is transitioning from the non-working operation mode to a working operation mode and a decrease in the height of the main frame above the soil surface exceeds a second threshold height adjustment.

6. The finishing tool position control system of claim 5, wherein the second threshold height adjustment is 25 mm.

7. The finishing tool position control system of claim 1, wherein the first sensor is configured to be positioned at the main frame of the agricultural implement and is configured to be directed toward the soil surface, and wherein the second sensor is configured to be positioned proximate the finishing assembly and directed toward the soil surface.

8. The finishing tool position control system of claim 7, wherein the first sensor or the second sensor comprises an infrared sensor, a radio detection and ranging (RADAR) sensor, a light detection and ranging (LIDAR) sensor, an ultrasonic sensor, or a capacitive sensor.

9. A finishing tool position control system for an agricultural implement, comprising:
    an actuator configured to be coupled to a finishing assembly of the agricultural implement and to control a position of the finishing assembly relative to a main frame of the agricultural implement; and
    a controller comprising a memory and a processor, wherein the controller is communicatively coupled to the actuator and configured to control a height of a finishing tool of the finishing assembly above a soil surface, wherein the controller is configured to receive a signal indicative of a height of the main frame above the soil surface and to adjust, via the actuator, the position of the finishing assembly relative to the main frame to increase the height of the finishing tool above the soil surface in response to determining that an increase in the height of the main frame above the soil surface exceeds a threshold height adjustment.

10. The finishing tool position control system of claim 9, comprising:
    a sensor communicatively coupled to the controller and configured to output the signal indicative of the height of the main frame of the agricultural implement above the soil surface, wherein the sensor is configured to be positioned at the main frame and is configured to be directed toward the soil surface.

11. The finishing tool position control system of claim 10, wherein the sensor comprises an infrared sensor, a RADAR sensor, a LIDAR sensor, an ultrasonic sensor, or a capacitive sensor.

12. The finishing tool position control system of claim 9, comprising a valve assembly configured to control a flow of fluid to the actuator, wherein the controller is communicatively coupled to the actuator via the valve assembly, and wherein the actuator comprises a double-acting hydraulic cylinder.

13. The finishing tool position control system of claim 9, wherein the threshold height adjustment is 75 mm.

14. The finishing tool position control system of claim 9, wherein a non-working operation mode is determined, via the controller, based on the height of the main frame exceeding the threshold height adjustment.

15. The finishing tool position control system of claim 14, wherein the controller is configured to decrease the height of the finishing tool above the soil surface in response to determining that the agricultural implement is transitioning from the non-working operation mode to a working operation mode and a decrease in the height of the main frame above the soil surface exceeds a second threshold height adjustment.

16. The finishing tool position control system of claim 15, wherein the second threshold height adjustment is 25 mm.

17. A finishing tool position control system for an agricultural implement, comprising:
    an actuator configured to be coupled to a finishing assembly of the agricultural implement and to control a position of the finishing assembly relative to a main frame of the agricultural implement; and
    a controller comprising a memory and a processor, wherein the controller is communicatively coupled to the actuator and configured to control a height of a finishing tool of the finishing assembly above a soil surface, wherein the controller is configured to receive a signal indicative of the height of the finishing tool above the soil surface and to adjust, via the actuator, the position of the finishing assembly relative to the main frame to increase the height of the finishing tool above the soil surface in response to determining that the agricultural implement is in a non-working operation mode and the height of the finishing tool above the soil surface is less than a threshold value.

18. The finishing tool position control system of claim 17, wherein the threshold value is 75 mm.

19. The finishing tool position control system of claim 17, comprising a main frame actuator communicatively coupled to the controller, wherein the main frame actuator is configured to adjust a height of the main frame above the soil surface, and wherein the controller is configured to:
    receive an indication of a desired transition to the non-working mode; and
    output instructions to cause the main frame actuator to increase the height of the main frame above the soil surface.

20. The finishing tool position control system of claim 19, wherein the controller is configured to receive the indication based on an input received via a user interface.

* * * * *